(12) United States Patent
Hiruma et al.

(10) Patent No.: US 10,766,094 B2
(45) Date of Patent: Sep. 8, 2020

(54) ARC WELDING DEVICE AND METHOD

(71) Applicant: HONDA MOTOR CO., LTD., Minato-ku, Tokyo (JP)

(72) Inventors: Yosuke Hiruma, Tochigi (JP); Keishi Setoda, Tochigi (JP); Yusuke Muramatsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 385 days.

(21) Appl. No.: 15/546,144

(22) PCT Filed: Jan. 22, 2016

(86) PCT No.: PCT/JP2016/051842
§ 371 (c)(1),
(2) Date: Jul. 25, 2017

(87) PCT Pub. No.: WO2016/121645
PCT Pub. Date: Aug. 4, 2016

(65) Prior Publication Data
US 2018/0001414 A1 Jan. 4, 2018

(30) Foreign Application Priority Data
Jan. 28, 2015 (JP) ................. 2015-014710

(51) Int. Cl.
*B23K 10/00* (2006.01)
*B23K 9/173* (2006.01)
(Continued)

(52) U.S. Cl.
CPC ............. *B23K 10/00* (2013.01); *B23K 9/173* (2013.01); *B23K 9/325* (2013.01); *B23K 10/02* (2013.01);
(Continued)

(58) Field of Classification Search
CPC .. B23K 10/00; B23K 10/02; B23K 2101/006; B23K 2101/18; B23K 9/173; B23K 9/325
(Continued)

(56) References Cited

U.S. PATENT DOCUMENTS 3,604,889 A 9/1971 Rohrberg
2009/0107958 A1* 4/2009 Khakhalev ............. B23K 9/173
219/74

FOREIGN PATENT DOCUMENTS

JP        S53-123349 A    10/1978
JP        S53123349     * 10/1978
JP        2013-180309 A    9/2013

* cited by examiner

*Primary Examiner* — Ibrahime A Abraham
*Assistant Examiner* — Biniam B Asmelash
(74) *Attorney, Agent, or Firm* — Carrier Blackman & Associates, P.C.; William D. Blackman; Joseph P. Carrier (57) ABSTRACT

A plasma ejection unit (21) of an arc welding device includes a plasma torch (26), a copper plate (27), a container (28), and a gas supplying unit (29). Plasma gas inside the container (28) is pressurized by argon gas supplied from the gas supplying unit (29), and ejected from first to eighth ejection ports. The plasma gas ejected from the first to eighth ejection ports is concentrated in a concentration area (CA) between vehicle body plates (16-17) to form through holes (40) in the vehicle body plates (16-17), and is separated. The air pressures, in eight areas, of the plasma gas reaching a vehicle body plate (18) are approximately one-eighth of the air pressure of the plasma gas in the concentration area (CA). Accordingly, while the through holes (40) are formed in the vehicle body plates (16-17), no through hole is formed in the vehicle body plate (18).

11 Claims, 5 Drawing Sheets

(51) Int. Cl.
*B23K 10/02* (2006.01)
*B23K 9/32* (2006.01)
*H05H 1/32* (2006.01)
*B23K 101/00* (2006.01)
*B23K 101/18* (2006.01)

(52) U.S. Cl.
CPC ......... *H05H 1/32* (2013.01); *B23K 2101/006* (2018.08); *B23K 2101/18* (2018.08)

(58) Field of Classification Search
USPC .............................................. 219/74, 121.43
See application file for complete search history.

ARC WELDING DEVICE AND METHOD

CROSS REFERENCE TO RELATED APPLICATIONS

This application is based upon, and claims the benefit of priority from PCT Application No. PCT/JP2016/051842 filed Jan. 2, 2016 which, in turn, claimed priority based on Japanese national application JP 2015-014710, filed Jan. 28, 2015. The entire contents of all of these priority applications are incorporated herein by reference.

TECHNICAL FIELD

The present invention relates to an arc welding device and method.

BACKGROUND ART

Welding of a vehicle body or the like, particularly, welding of a plurality of overlapped vehicle body plates (workpieces) is performed by an arc welding device. The arc welding device generates an arc and performs penetration welding of the plurality of workpieces by the arc.

An arc welding device disclosed in Patent Document 1 includes a plasma torch and a MIG (metal inert gas) torch. The plasma torch ejects plasma gas toward a plurality of overlapped workpieces to generate a plasma arc between the plasma torch and the workpieces. A wire-like filler is molten to fill from the MIG torch to the holes which are formed in the workpieces by the plasma arc, thereby welding the plurality of workpieces.

Furthermore, in Patent Document 1, the through holes formed in the plurality of workpieces are detected, and the flow rate of plasma gas is reduced after detection of the through holes. The arc voltages before and after reduction of the gas flow rate are measured, and the measurement result is compared with data obtained in advance. Thus, the lower hole diameter of the through holes is detected. When the lower hole diameter is detected, welding through the MIG torch is performed. When the lower hole diameter is not detected, welding through the MIG torch is not performed.

CITATION LIST

Patent Literature

Patent Document 1: Japanese Patent Laid-Open No. 2013-180309

SUMMARY OF INVENTION

Technical Problem

In vehicle body welding, a separate vehicle body plate is placed at the back of a plurality of vehicle body plates to be welded together, in many cases. In such case, after through holes penetrating through the plurality of vehicle body plates are formed by plasma gas from the arc welding device disclosed in Patent Document 1, the plasma gas passes through the through holes to reach the vehicle body plate at the back side. Thus, there is a problem that a through hole may also be formed in the vehicle body plate at the back side.

The arc welding device disclosed in Patent Document 1 detects the formation of through holes in the plurality of workpieces, and reduces the flow rate of plasma gas after detection of the through holes. However, the plasma gas having a high air pressure at the time of forming the through holes passes through the through holes to reach the vehicle body plate at the back side. A through hole may be prevented from being formed in the vehicle body plate at the back side by ejecting plasma gas having a low air pressure. However, in this case, a time period required for welding is increased, and thus, such welding has not been in practice.

The present invention has been made in view of the above circumstances, and an object of the present invention is to provide an arc welding device and method capable of reliably welding workpieces to be welded while reducing an influence on any workpiece other than the workpieces to be welded.

Solution to Problem

An arc welding device of the present invention includes a container configured to accommodate gas for arc welding, and a plurality of ejection ports formed in the container so as to eject the gas accommodated in the container, wherein the gas ejected from the plurality of ejection ports is concentrated in a prescribed concentration area such that a workpiece is welded in the concentration area.

According to the arc welding device of the present invention, the gas ejected from the plurality of ejection ports is separated after welding the workpiece in the concentration area. Accordingly, even when a through hole is formed in the workpiece by the gas, the air pressure of the gas passing through the through hole to reach a workpiece at the back side of the welded workpiece is lower than the air pressure of gas in the concentration area. For this reason, a through hole is prevented from being formed in the workpiece at the back side.

Further, in the container, a gas generating unit which has a copper plate disposed in the container and a plasma torch disposed in the container, may be included. The plasma torch is configured to discharge plasma toward the copper plate to generate the gas.

Further, it is preferable to include a filler filling unit configured to fill, during welding of the workpiece, a portion of the workpiece which is molten by the gas in the concentration area, with a filler in a molten state. The portion of the workpiece is a portion.

Since the portion of the workpiece which is a portion molten by the gas in the concentration area is filled with the filler in a molten state, the workpiece can be reliably welded.

Further, it is preferable to include a shielding gas supplying unit configured to supply shielding gas to inside of the container to pressurize the inside of the container.

Since the shielding gas supplied to the inside of the container pressurizes the inside of the container, the air amounts of gas ejected from the plurality of ejection ports can be increased.

An arc welding method of the present invention includes a step of generating gas for arc welding, a step of ejecting the gas from a plurality of ejection ports so as to concentrate the gas in a prescribed area, and a step of welding a workpiece by the gas concentrated in the prescribed area.

According to the arc welding method of the present invention, the workpiece is welded by the gas ejected from the plurality of ejection ports and concentrated in the prescribed area. Accordingly, even while the through hole is formed in the workpiece by the gas, a through hole is prevented from being formed in a workpiece at the back side of the welded workpiece.

Advantage Effects of Invention

According to the present invention, workpieces to be welded can be reliably welded while an influence on any workpiece other than the workpieces to be welded is reduced.

DESCRIPTION OF EMBODIMENT

Hereinafter, an embodiment of the present invention will be described with reference to the drawings.

Figure 1:
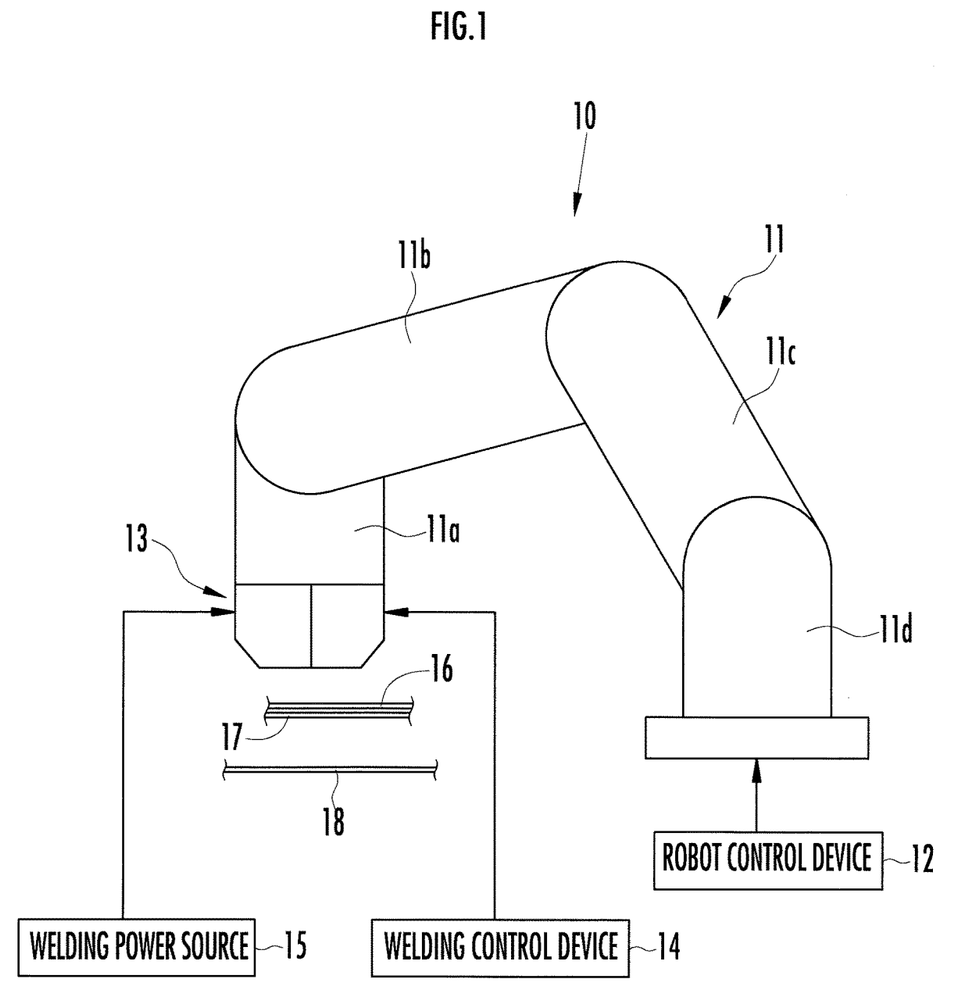
FIG. 1 is a side view illustrating an arc welding device according to the present invention.

As shown in FIG. 1, an arc welding device 10 includes a welding robot 11, a robot control device 12, a welding torch 13, a welding control device 14, and a welding power source 15. The arc welding device 10 welds two overlapped vehicle body plates 16, 17 together, to form a dashboard of a vehicle body, for example. A vehicle body plate 18 is placed under the vehicle body plates 16, 17.

The welding robot 11 is a multi-shaft and multi-joint welding robot, for example, and includes, from the leading end side thereof, arms 11a to 11d. The welding robot 11 includes a plurality of motors (not shown) which drive the arms 11a to 11d, and driving of the welding robot 11 is controlled by the robot control device 12. The welding torch 13 is attached to the arm 11a at the most leading end side of the welding robot 11.

The robot control device 12 drives the plurality of motors of the welding robot 11 to drive the arms 11a to 11d. Thus, the position and orientation of the welding torch 13 attached to the arm 11a are controlled.

Figure 4:
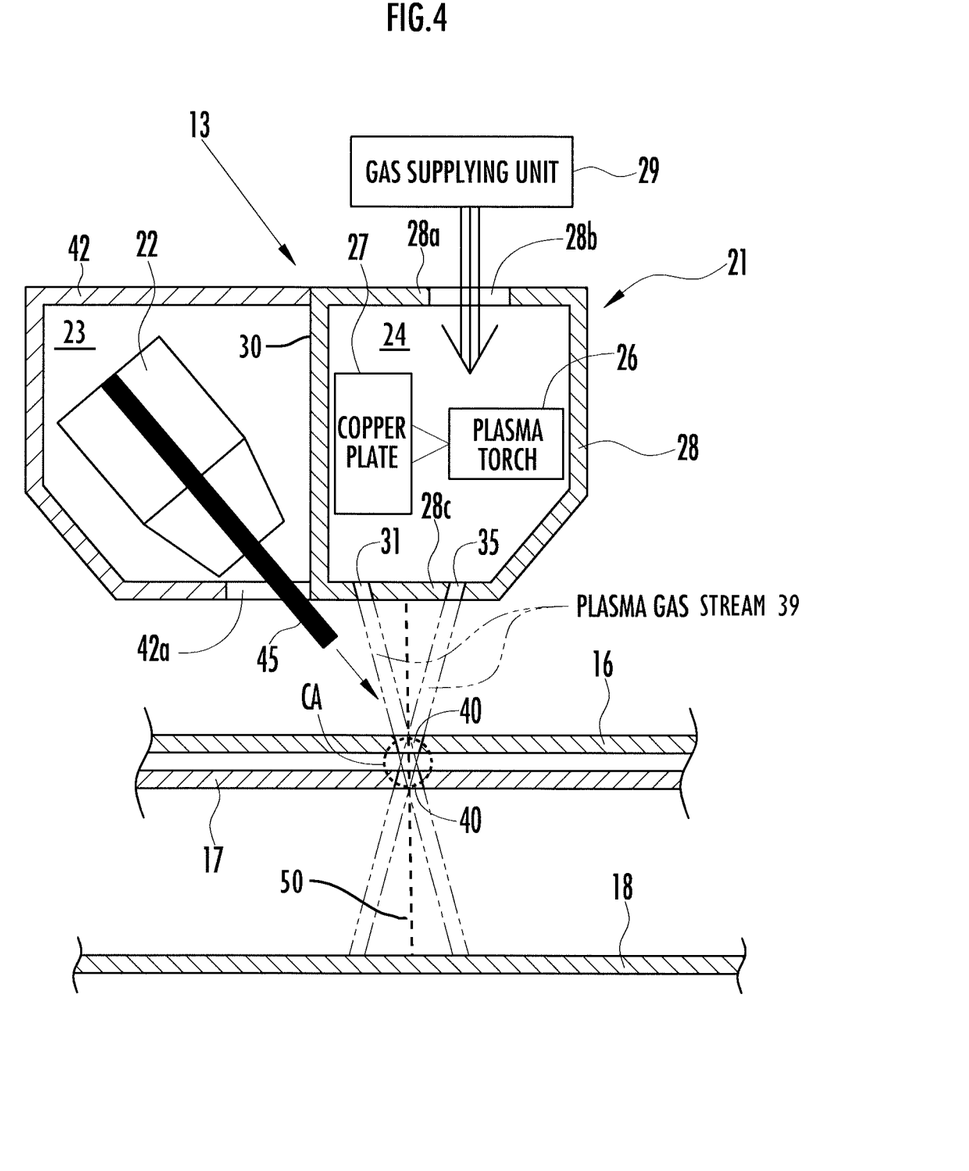
FIG. 4 is a side cross sectional view illustrating the welding torch which is ejecting plasma gas toward the vehicle body plates.

As shown in FIG. 4, the welding torch 13 has a first chamber 23 formed therein which contains a plasma ejection unit 21, and a second chamber 24 formed therein which contains a MIG (metal inert gas) torch 22, and the welding torch 13 is driven by power supplied from the welding power source 15 (see FIG. 1). In the depicted embodiment, the welding torch 13 has a partition 30 formed therein, which divides an interior of the thereof into the first and second chambers 23, 24.

The plasma ejection unit 21 includes a plasma torch 26, a copper plate 27, a container 28 accommodating the plasma torch 26 and the copper plate 27, and a gas supplying unit 29 connected to the container 28. The plasma torch 26 and copper plate 27 are disposed in the second chamber 24 of the welding torch 13, which is formed at the interior of the container 28. Driving of the MIG torch 22, the plasma torch 26, and the gas supplying unit 29 is controlled by the welding control device 14 (see FIG. 1).

On the plasma torch 26, an electrode and a nozzle (both are not illustrated) are formed to generate plasma. The plasma torch 26 discharges the generated plasma toward the copper plate 27 and generates plasma gas for arc welding.

An opening 28b is formed in the upper surface 28a of the container 28. Shielding gas such as argon gas, for example, is supplied from the gas supplying unit 29 to the inside of the container 28 through the opening 28b. The argon gas supplied to the inside of the container 28 pressurizes the inside of the container 28. Shielding gas supplied from the gas supplying unit 29 is not limited to argon gas, and helium gas may be supplied, for example. The inside of the container 28 does not need to be pressurized through gas supply.

Figure 2:
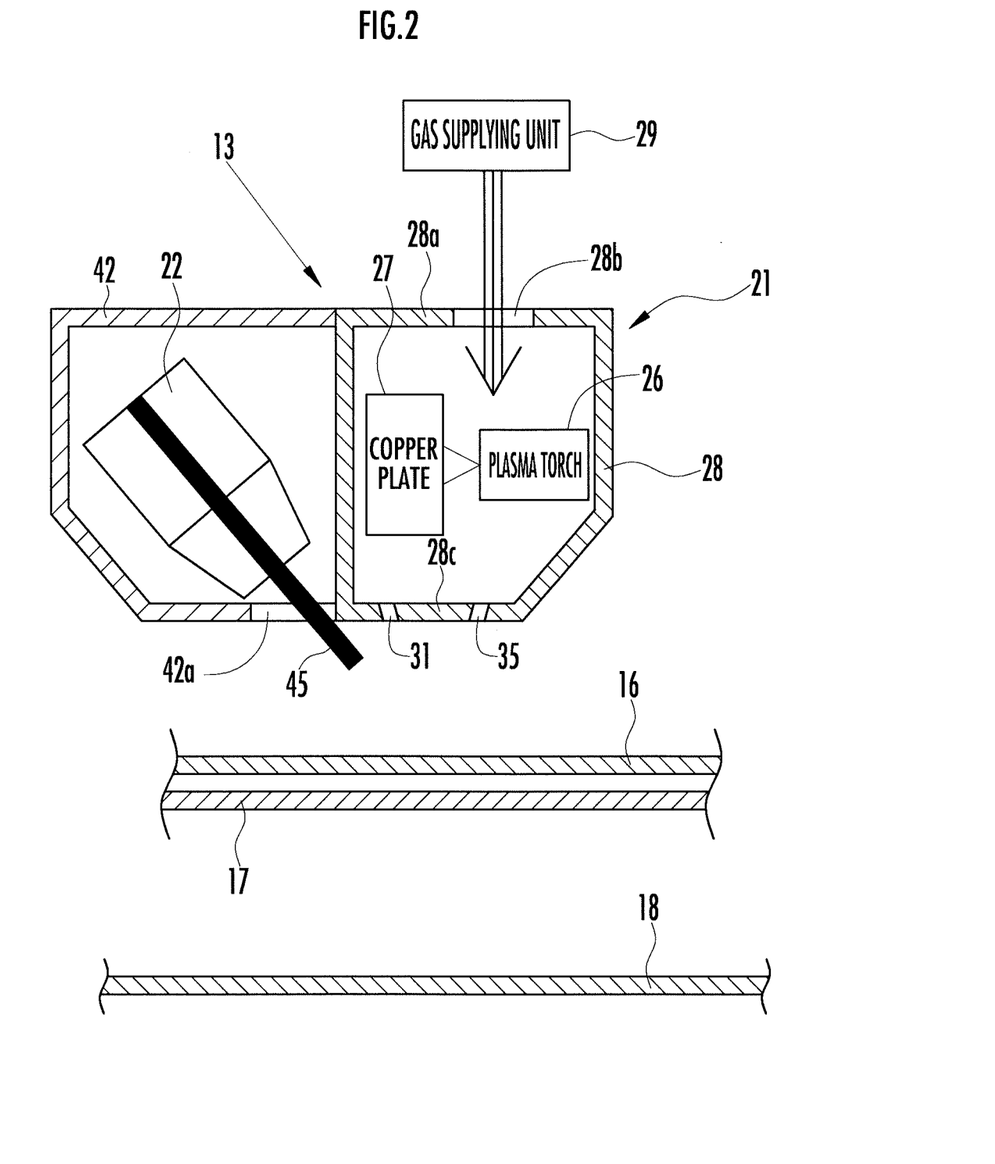
FIG. 2 is a side cross sectional view illustrating a welding torch and vehicle body plates.
Figure 3:
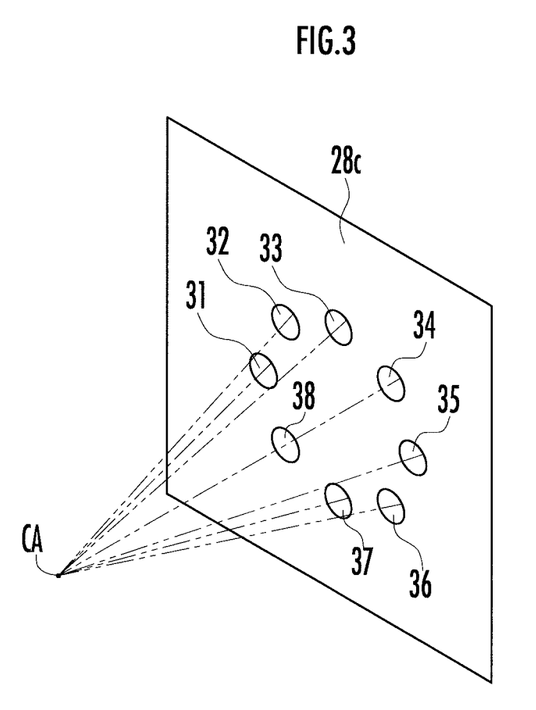
FIG. 3 is a perspective view of the lower surface of a container having first to eighth ejection ports formed therein.

As shown in FIG. 2 and FIG. 3, first to eighth ejection ports 31 to 38 for ejecting plasma gas toward the vehicle body plates 16, 17 are formed in the lower surface 28c of the container 28. As shown in FIG. 4, the ejection ports 31 to 38 are arranged around a common axis 50. When the inside of the container 28 is pressurized by argon gas supplied from the gas supplying unit 29, plasma gas inside the container 28 is ejected from the first to eighth ejection ports 31 to 38.

The first to eighth ejection ports 31 to 38 are formed at 45° pitches on the same circumference, and are formed in orientations different from one another such that the plasma gas ejected therefrom forms a plurality of substantially linear plasma gas streams 39, which converge toward one another along the common axis 50, as shown in FIGS. 3-4, and these plasma gas streams are concentrated in a concentration area CA.

As shown in FIG. 4, the concentration area CA in which the plasma gas ejected from the first to eighth ejection ports 31 to 38 is concentrated, is a space between the vehicle body plates 16, 17. By the plasma gas ejected from the first to eighth ejection ports 31 to 38, through holes 40 are formed in the vehicle body plates 16 and 17.

The MIG torch 22 is accommodated in a container 42. The MIG torch 22 feeds a wire like filler 45 supplied from a filler supplying device (not illustrated) toward the through holes 40 formed in vehicle body plates 16, 17. An opening 42a through which the filler 45 passes is formed in the lower surface of the container 42. As the filler 45, the same material as that of the vehicle body plates 16, 17 is used.

As shown in FIG. 1, when the arc welding device 10 welds the vehicle body plates 16, 17 together, the welding robot 11 is driven by the robot control device 12 such that the position and orientation of the welding torch 13 attached to the arm 11a on the most leading end side are desirably set.

Next, as shown in FIG. 4, the welding control device 14 drives the plasma torch 26 to discharge plasma toward the copper plate 27. Further, the welding control device 14 drives the gas supplying unit 29 to supply argon gas to the inside of the container 28.

As a result of plasma discharge from the plasma torch 26 toward the copper plate 27, plasma gas is generated. The plasma gas is pressurized by argon gas supplied from the gas supplying unit 29, and is ejected from the first to eighth ejection ports 31 to 38 formed in the lower surface 28c of the container 28 as a plurality of substantially linear, convergent plasma gas streams 39.

By the plasma gas ejected from the first to eighth ejection ports 31 to 38, the through hole 40 is formed in the upper vehicle body plate 16 of the two overlapped vehicle body plates 16, 17.

After the through hole 40 is formed in the vehicle body plate 16, the plasma gas ejected from the first to eighth ejection ports 31 to 38 reaches the vehicle body plate 17, so that the through hole 40 is also formed in the vehicle body plate 17.

After the through hole 40 is also formed in the vehicle body plate 17, the plasma gas ejected from the first to eighth ejection ports 31 to 38 passes through the respective through holes 40 of the vehicle body plates 16, 17 to reach the vehicle body plate 18 placed under the vehicle body plate 17.

In the present embodiment, the plasma gas ejected from the first to eighth ejection ports 31 to 38 is concentrated in the concentration area CA between the vehicle body plates 16 and 17. By the plasma gas concentrated in the range of the concentration area CA, the through holes 40 are formed in the vehicle body plates 16, 17. Thus, the through holes 40 can be easily formed.

The plasma gas streams 39 ejected from the first to eighth ejection ports 31 to 38, and concentrated in the concentration area CA, are separated and diffused after passing through the concentration area to reach eight spaced apart areas of the vehicle body plate 18. In the present embodiment, the plasma gas ejected from each of the first to eighth ejection ports 31 to 38 has an air pressure which is approximately one-eighth of the combined air pressure of the plasma gas concentrated in the concentration area CA in order to form the through holes in the vehicle body plates 16, 17.

Each of the air pressures, in the eight areas, of the plasma gas ejected from the first to eighth ejection ports 31 to 38 to reach the vehicle body plate 18 is approximately one-eighth of the air pressure of the plasma gas in the concentration area CA. In addition, each of the temperatures, in the eight areas, of the plasma gas reaching the vehicle body plate 18 is lower than the temperature of the plasma gas in the concentration area CA. Accordingly, even while the through holes 40 are formed in the vehicle body plates 16, 17, no through hole is formed in the vehicle body plate 18.

In parallel with formation of the through holes 40 in the vehicle body plates 16, 17, the welding control device 14 drives the MIG torch 22 to feed the filler 45 toward the through holes 40 in the vehicle body plates 16, 17. The fed filler 45 is molten by the plasma gas ejected from the first to eighth ejection ports 31 to 38, and the through holes 40 are filled with the molten filler 45. Alternatively, the filler 45 is fed after the through holes 40 are formed. Also in this case, the filler 45 may be molten by the plasma gas ejected from the first to eighth ejection ports 31 to 38.

Figure 5:
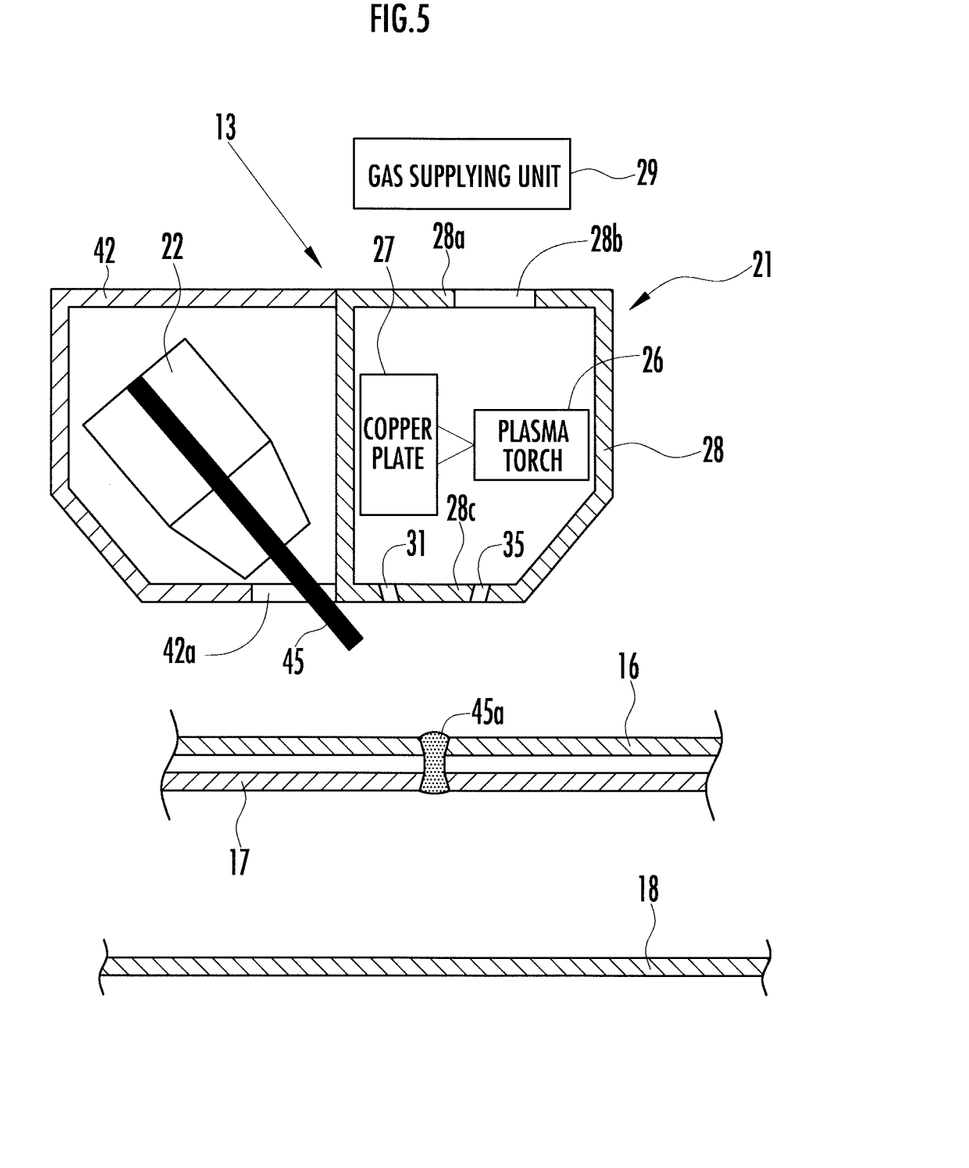
FIG. 5 is a side cross sectional view showing the welding torch in a state of having welded vehicle body plates.

As shown in FIG. 5, when ejection of the plasma gas is stopped, the molten filler 45a filling the through holes 40 is hardened, and thus, the vehicle body plates 16, 17 are welded together. Accordingly, a dot-like weld bead is formed in the vehicle body plates 16, 17, and thus, spot welding is performed.

In the aforementioned embodiment, the arc welding device that performs welding by forming a dot-like weld bead in the vehicle body plates 16, 17 has been described. However, the present invention is also applicable to an arc welding device that performs welding by forming a linear weld bead in the vehicle body plates 16, 17. To perform arc welding by forming a linear weld bead, then the welding robot 11 is driven to move the welding torch 13 to a welding position, plasma gas is ejected from the first to eighth ejection ports 31 to 38 of the welding torch 13, and the through holes 40 are formed in the vehicle body plates 16, 17. Thereafter, the filler 45 is molten by the plasma gas to fill the through holes 40 with the filler 45, and the welding torch 13 is moved through driving of the welding robot 11. As a result of the movement, the molten filler 45a filling the through holes 40 in a range which the plasma gas no longer reaches, is hardened, and thus, the vehicle body plates 16, 17 are welded together. By continuously repeating this, a linear weld beads is formed in the vehicle body plates 16, 17 and the vehicle body plates 16, 17 are welded together in a prescribed range.

In the aforementioned embodiment, the concentration area CA for the plasma gas ejected from the first to eighth ejection ports 31 to 38 of the welding torch 13 is fixed between the vehicle body plates 16 and 17. Alternatively, during welding, the concentration area CA may be moved by moving the welding torch 13 through driving of the welding robot 11. In this case, when welding is started, the concentration area CA is positioned on the upper surface of the vehicle body plate 16. The welding torch 13 is moved (moved down) according to the welding speed of the vehicle body plates 16, 17, and thereby, the concentration area CA is moved down to the lower surface of the vehicle body plate 17. After filling with the filler 45, the welding torch 13 is moved (moved up), and thereby, the concentration area CA is moved up to the upper surface of the vehicle body plate 16.

In the aforementioned embodiment, the eight ejection ports are formed in the lower surface 28c of the container 28. However, the number of the ejection ports may be varied, as appropriate. Further, a plurality of ejection ports may be formed on each of a plurality of circumferences having different diameters.

In the aforementioned embodiment, plasma gas is generated by plasma discharged from the plasma torch 26 toward the copper plate 27. However, a plasma gas generating unit is not limited to this, and any unit may be used as long as plasma gas is generated.

In addition, gas for arc welding is not limited to plasma gas, and may be varied, as appropriate. For example, welding may be performed by carbon dioxide gas.

In the aforementioned embodiment, the two vehicle body plates 16, 17 are welded together by the arc welding device 10. However, one vehicle body plate or three or more vehicle body plates may be welded.

Moreover, without providing the MIG torch 22, the vehicle body plates 16, 17 may be welded together through molten portions of the vehicle body plates 16, 17, which are generated when the through holes 40 in the vehicle body plates 16, 17 are formed.

REFERENCE SIGNS LIST

10 . . . arc welding device, 11 . . . welding robot, 12 . . . robot control device, 13 . . . welding torch, 14 . . . welding control device, 16-18 . . . vehicle body plate, 21 . . . plasma ejection unit, 22 . . . MIG torch, 26 . . . plasma torch, 27 . . . copper plate, 28 . . . container, 29 . . . gas supplying unit, 31-38 . . . first to eighth ejection ports, 40 . . . through hole, 45 . . . filler, 45a . . . molten filler

The invention claimed is:

1. An arc welding device comprising:
a container having a first chamber and a second chamber formed therein separated by a partition, the second chamber configured to accommodate a plasma gas for arc welding;
a plurality of ejection ports formed in the second chamber of the container, the ejection ports configured to eject the plasma gas therefrom in a plurality of plasma gas streams,
a wire dispenser disposed in the first chamber of the container for dispensing a meltable filler wire, and
a plasma gas generating unit disposed in the second chamber of the container, the plasma gas generating unit comprising a copper plate and a plasma torch, the plasma torch being configured to discharge plasma toward the copper plate to generate the plasma gas, wherein the arc welding device is configured and arranged such that during operation thereof, the plasma gas, ejected from the plurality of ejection ports as the plurality of plasma gas streams, is concentrated in a prescribed concentration area such that a workpiece is welded in the concentration area.

2. The arc welding device according to claim 1, further comprising a filler filling unit configured to fill, during welding of the workpiece, a portion of the workpiece which is molten by the plasma gas in the concentration area, with a filler in a molten state wherein the filler is melted filler wire from the wire dispenser.

3. The arc welding device according to claim 1, further comprising a shielding gas supplying unit configured to supply shielding gas to an area inside of the second chamber of the container to pressurize the area inside of the second chamber of the container.

4. An arc welding method performed with an arc welding device including a container having a first chamber and a second chamber formed therein separated by a partition, the first chamber having a wire dispenser disposed therein for dispensing a meltable filler wire, the second chamber of the container having a copper plate and a plasma torch disposed therein, said arc welding method comprising:
a step of generating a plasma gas, for arc welding, in the second chamber of the container, the plasma torch being configured to discharge plasma toward the copper plate to generate the plasma gas;
a step of ejecting the plasma gas in a plurality of plasma gas streams from a plurality of ejection ports formed in the second chamber of the container so as to concentrate the plasma gas streams in a prescribed area; and
a step of welding a workpiece by the plasma gas concentrated in the prescribed area.

5. The method of claim 4, wherein the method is carried out by a welding robot.

6. The method of claim 4, further comprising steps of:
dispensing a meltable wire filler from the wire dispenser disposed in the first chamber of the container;
forming a hole in the prescribed area of the workpiece by the ejected plasma gas streams; and
melting a portion of the wire filler into the hole formed in the workpiece during the welding step.

7. The method of claim 6, wherein:
each of the ejection ports is disposed at an angle in relation to a common axis,
a plurality of linear plasma gas streams are formed by plasma gas being ejected during the plasma ejecting step, and
the plasma gas streams converge together in the prescribed area during the hole forming step.

8. The method of claim 6, wherein the workpiece comprises first and second metal plates abutting one another in overlapped relation, wherein a third metal plate is spaced away from the first and second metal plates, and wherein the plasma gas streams diverge from one another after passing through the prescribed area and before contacting the third metal plate.

9. An arc welding device comprising:
a welding torch configured to accommodate a plasma gas for arc welding, the welding torch containing a first container having a first chamber formed therein housing a wire dispenser for dispensing a meltable filler wire, and a second container configured to accommodate a plasma gas for arc welding, the second container having a second chamber formed therein housing a plasma ejection unit including a plasma gas generating unit which comprises a copper plate and a plasma torch configured to discharge plasma toward the copper plate to generate the plasma gas;
the plasma ejection unit having a plurality of ejection ports formed in a wall of the second container and configured to eject the plasma gas from the second container in a plurality of plasma gas streams;
wherein the arc welding device is configured and arranged such that during operation thereof, the ejection ports converge and concentrate all of the plasma gas streams passing outwardly therefrom into a specifed concentration area at a first distance from the ejection ports, in order to form an opening in a workpiece in the concentration area, and to fill the opening with melted filler wire from the wire dispenser.

10. The arc welding device of claim 9, wherein the plasma ejection unit is configured and arranged so that at a second distance from the ejection ports which is greater than the first distance, the plasma gas streams will diverge from one another.

11. The arc-welding device of claim 9, wherein the welding torch has a partition formed therein which separates an interior space of the container into a first part and a second part, and isolates the plasma torch from the wire dispenser.

* * * * *